INVENTORS
J. F. DILLON, JR.
L. F. JOHNSON
J. P. REMEIKA

United States Patent Office 3,480,877
Patented Nov. 25, 1969

3,480,877
SOLID STATE LASER
Joseph F. Dillon, Jr., Morris Township, Morris County,
Leo F. Johnson, Bedminster, and Joseph P. Remeika,
Warren Township, Somerset County, N.J., assignors to
Bell Telephone Laboratories, Incorporated, New York,
N.Y., a corporation of New York
Filed Mar. 23, 1966, Ser. No. 536,722
Int. Cl. H01s 3/18
U.S. Cl. 331—94.5                                    8 Claims

ABSTRACT OF THE DISCLOSURE

Laser action is produced from one of the rare earth ions of holmium, thulium or erbium within a ferrimagnetic garnet crystalline composition. Laser emission may be modulated by means of an applied magnetic field.

---

This invention relates to lasers utilizing as the active elements crystalline bodies of saturable magnetic materials of the garnet structure. Such devices lend themselves to arrangements in accordance with which magnetic fields are used to modulate or otherwise alter the laser output, and a preferred species is concerned with such arrangements.

For several years there has been intense activity directed toward the development of laser devices. This activity has resulted in the commercial availability of coherent light sources operating over a substantial frequency range and has resulted also in fulfillment of many of the postulated uses described by so many at the time of the invention of the prototype device. Accordingly, Raman spectroscopy has become a far more significant tool, delicate surgery has been performed, extremely fine machining may be accomplished, etc.

It is generally recognized, however, that there is at least one field of use in which much development work remains to be carried out. In the field of communications, while there are acceptable CW laser sources both of the gas and solid state variety, there has as yet been no general acceptance of any particular arrangement for modulating the beam so as to make use of the tremendous bandwidth which is inherent in oscillators operating at light frequencies. Of course, there have been significant contributions in the form of modulators and parametric devices based on magneto-optic, electro-optic and piezo-optic interactions, and any of these may well become the prevalent modulators of a future communications system. All such devices described to date take the form of apparatus auxiliary to the laser itself. While such separation may be acceptable, or even desirable, alternate systems based on internal modulation or tuning, that is within the laser, may prove advantageous and should also be studied. Such inquiries, at least those concerning magnetic interactions, have, to date, been frustrated. There has been no disclosure of a magnetic material which has operated as a laser host.

It has now been discovered that any of a class of magnetic materials of the garnet structure exemplified by $Y_3Fe_5O_{12}$ (YIG) may serve as a laser host for certain designated emitting ions. When properly doped, this virtually coal-black material may operate with a quantum efficiency approaching that of the best known solid state lasers.

Ions which may emit in such a host include holmium, thulium, and erbium. Energy transfers from one such rare earth to another permit more effective use of any of the usual pump sources and so increase the efficiency of the device. A particularly effective laser for operation over a temperature range substantially below room temperature makes use of all three ions and may even incorporate a fourth, such as ytterbium, which in turn transfers its absorbed energy to one of the others.

Suitable magnetic garnet compositions, in addition to YIG, include the rare-earth garnets erbium-iron garnet, thulium-iron garnet, lutecium-iron garnet, and ytterbium-iron garnet, as well as modifications of YIG or any such rare-earth garnet in which iron is partially replaced by aluminum, gallium, or vanadium, and in which the yttrium site is partially occupied by bismuth, a compensating ion such as calcium, and combinations of any of the foregoing. Other magnetic garnets are suitable host materials from the standpoint of laser action but may be nonpreferred for device use in which reliance is had upon a magneto-optic interaction. The particular rare-earth garnet compositions named are, of course, desirable where energy is to be transferred to a different emitting ion, since absorption may be so enhanced. In general, rare-earth garnets in which the yttrium site is wholly occupied by the emitting ion are not useful, since the presence of so great an amount of such ion produces quenching. Hosts which are nominally lacking in either yttrium or rare earth, except, of course, for doping levels of the active ions, may be particularly suitable for certain device uses, since rare-earth impurities resulting in resonance line broadening may be so avoided. An illustrative composition of this type is the calcium-vanadium garnet or the bismuth-calcium-vanadium garnet of copending United States application Serial No. 293,962, filed July 10, 1963, Patent No. 3,268,452.

From a device standpoint, partial substitution of iron may be desirable in that such expedient results in a reduction of the saturation magnetization, either by dilution, as is the case with aluminum substitution, or by compensation as occurs with gallium. Generally, compositional compensation results also by the use of any of the rare-earth ions including those enumerated above.

In accordance with the invention, therefore, it has been found that laser action utilizing one of the emitting ions holmium, thulium, or erbium may take place in a magnetic composition of the garnet structure. Suitable host materials are the prototype, $Y_3Fe_5O_{12}$, and modifications including those in which yttrium is partially or totally replaced by a rare-earth, calcium or bismuth, as well as those in which iron is partially replaced by vanadium, aluminum, and gallium, and also mixed crystals of any of the foregoing. An aspect of the invention is concerned with such lasers in which provision is made for an applied magnetic field. Variation of such field in amplitude and/or direction may produce a change in the laser output, and in this manner may serve as a modulator or tuner by altering the frequency, amplitude, or direction of the laser emission. These interactions are of interest in traveling wave as well as standing wave devices.

It is convenient to present the exemplary class of suitable magnetic host materials in terms of the general formula:

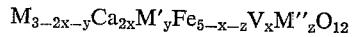

$$M_{3-2x-y}Ca_{2x}M'_yFe_{5-x-z}V_xM''_zO_{12}$$

where M is at least one of the ions yttrium, erbium, ytterbium, thulium, or bismuth, M' is at least one of the ions holmium, erbium, and thulium and includes at least one ion not included within M, M" is at least one of the ions gallium and aluminum, $x$ is from 0 to 1.5, $y$ is from .003 to .6, and $z$ is from 0 to 2.5. Of course, other modifications may be made in the host material without deleterious effect, or even with beneficial effect for certain specific purposes, as will become apparent in the detailed description. Such modifications may include other ions such as iron substitutions by, for example, germanium and silicon. The limits implied by the general formula above are most critical as they affect the concentration of emitting ion M'.

The reasons for the minimum and maximum values are orthodox. The minimum value expressed for the emitting ion, generally M', is intended to define a level which is required for lasing. The maximum is intended to prescribe a tolerable level which does not result in quenching. In the final analysis, the possibility of exceeding either limit, and also the selection of a preferred level within the limits, is to be determined on the basis of configuration, size, and other considerations. For example, thick elements may permit use of smaller amounts of emitting ion, and the use of very thin elements may permit larger amounts. The optimum amount of absorbing ion, M in the generalized formula, results from the desideratum that a reasonable fraction of the pump light be absorbed within the element. This consideration plainly results in smaller amounts of absorbing ion (smaller value of $x$) for increasing dimension in the direction in which pump energy is introduced.

The doping levels have been generally described. The choice of ions and their relative amounts depend on many considerations. For example, operation at liquid nitrogen temperature has been observed for 0.06 atom of holmium, and 0.15 atom each of thulium and erbium. For many purposes, compositions of this nature, that is, those including equal amounts of the absorbing ions erbium and thulium, both generally in excess of the emitting ion holmium, are to be preferred. It is seen that the thulium ion, with its absorption at 1.6 to 1.8 microns and 1.1 to 1.25 microns, in cooperation with erbium, with its absorption over the range of from 1.4 to 1.6 microns, together utilize a fair fraction of the energy emitted over the wavelength range of the absorption curve at about one micron down to the emission frequency of holmium at about 2.1 microns. The conversion efficiency may be still further enhanced by inclusion of ytterbium, which absorbs from 0.85 to 1 micron and pumps its energy into thulium and holmium.

While this combination is remarkably efficient for low temperature operation, the increased population of the bottom laser level in holmium may limit its utility at or above room temperature. For higher operation it is desirable to use a thulium emitting ion with a ytterbium or erbium absorbing ion.

While some of the devices within the scope of this invention may be of interest without regard to modified operation under the influence of a magnetic field, it is likely that these devices will be of greatest importance in such connection. For most devices which owe their operation to an interaction between a magnetic field and the frequency or amplitude of a laser beam, it is often desirable to magnetically saturate the host at least some time during operation.

Yttrium-iron garnet and other included compositions in which the yttrium site is partially or completely substituted by other non-magnetic ions have Curie points which are several hundred degrees above room temperature. The Curie point for YIG is, for example, at about 270° C. This, in turn, gives rise to a saturation magnetic introduction of the order of 1500 gauss at room temperature and somewhat greater values for lower temperature. While such levels may be tolerable for some uses, it is expected that lower saturation will be advantageous for certain others. It has been recognized for other uses that garnet compositions having lower saturation magnetizations are desirable, and compositions developed for these purposes are suitable host materials for the lasers in accordance with this invention. It has been discovered, for example, that certain of the rare earths in replacing yttrium in whole or in part since they, too, are magnetic, align so as to interact with the iron and reduce the net magnetization. This net magnetization, it is well known, is temperature dependent and may actually result in a zero moment at the so-called compensation point. Such compositional compensation points occur at about 80° K. for complete substitution by erbium and at lower temperatures for ytterbium and thulium substitution. Operation with such compositions permits the use of smaller applied fields, with such fields decreasing as the compensation points are approached.

Compensation may be achieved also by substitution for iron. The use of aluminum, for example, results in a lessening of the net magnetization, since a slight preference exists for the tetrahedral coordinated iron ions. The moment in such compositions may be effectively reduced to a value of about 1 $n_B$ by use of the composition $M_3Fe_{3.5}Al_{1.5}O_{12}$. It is well known that gallium has a still stronger preference for tetrahedral iron, and that it may be substituted in that position with a linearly reducing magnetization through a zero moment compensation point at about 1.3 atoms of gallium. Greater amounts of gallium actually result in an increase in net moment, but of sign opposite to that of the unsubstituted material. The effect of aluminum is very little more than a magnetization diluent, although it does also reduce the Curie point somewhat. Use of gallium, on the other hand, may result in a reduction in magnetization without substantial line broadening. It is clear that sufficient is known to permit selection of a magnetic host having the desired saturation magnetization at any given temperature while still retaining those properties upon which the invention is premised. The high frequency absorption edge in the garnet structure is due, in the ideal case, to the absorption of the trivalent iron itself. Neither gallium nor aluminum nor vanadium has absorptions over the concerned frequency range. The rare-earth absorptions are in this range, and the compensated compositions utilizing any of these cannot be chosen without regard to the energy transfer and emission responsible for lasing.

In D. L. Wood and J. P. Remeika, Journal of Applied Physics, supplement 1966, vol. 37, page 1232 et seq., "Optical Transparency of Rare-Earth Iron Garnets," it is shown that the high frequency absorption edge in the garnet structure may be sharpened by minimization of the divalent iron, and means for accomplishing this are described. While this improvement in transparency can have little effect on systems utilizing any of the emitting ions holmium, erbium, and thulium, use of ions emitting over the range of from about 1 to 1.5 microns, or the desire to more effectively absorb over this wavelength range, may make this further refinement desirable.

The magnetic garnet host laser owes its operablity, in part, to the presence of a relatively transparent region over the approximate wavelength range of from one micron to 4.5 microns, and all included systems are designed to operate in this region. Since the only devices with which this invention is concerned are those which utilize optical pumping, choice of a suitable pump is determined by its output over the indicated region. Fortunately, the common tungsten filament, since it is essentially a "black body" emitter, delivers a large fraction of its energy over this wavelength range. The energy spectrum of such a pump may be tailored to the requirements of these devices by adjusting the brightness temperature.

Further description of the invention is expedited by reference to the drawing, in which.

Figure 1:
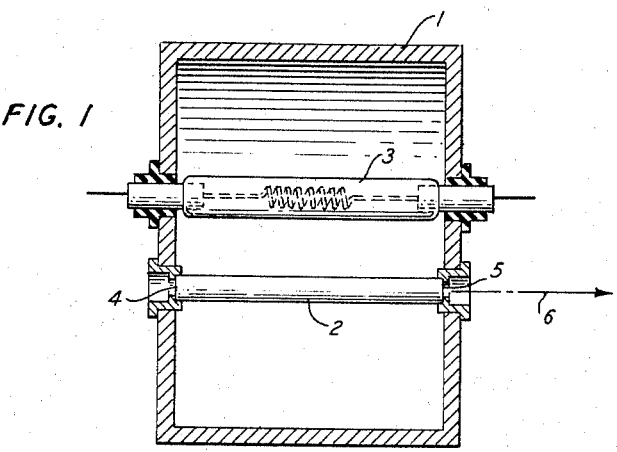
FIG. 1 is a cross-sectional view of a pump cavity and laser device in accordance with this invention.

Referring again to FIG. 1, the apparatus depicted consists of elliptical cavity 1 containing laser 2, which consists of a single crystal of a magnetic garnet composition such as YIG doped with an emitting ion such as holmium consistent with the description above. The cavity also contains a pump 3 which, as described, may be a tungsten filament device, so arranged so that both it and laser 2 are at focal points of the ellipse formed by cavity 1. Laser 2 is provided with coated ends 4 and 5, the former providing for complete, and the latter for partial, reflectance. Coherent emission, shown as arrow 6, emanates from partially reflecting end 5.

Figure 2:
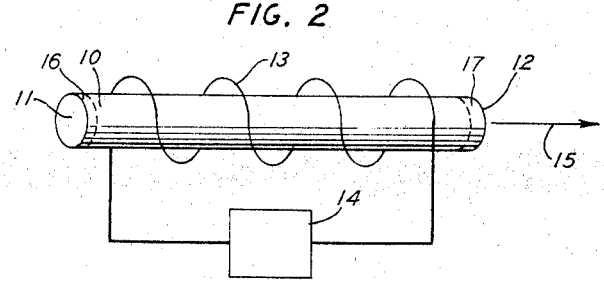
FIG. 2 is a perspective view of a laser provided with means for introducing a magnetic field.

The device of FIG. 2 consists of a rod 10 of one of the laser compositions herein having polished ends 11 and 12 which may again be provided with coatings for oscillator operation or not for amplifier operation. Rod 10 may also be provided with plane-polarizing means 16 and/or 17 as discussed further on. An encircling conductor 13 attached to signal source 14 permits introduction of a magnetic field in the direction of laser propagation, as indicated by arrow 15. (Note: Incoming beam and/or pump not shown.) It is well known that the domain magnetic host materials herein are gyromagnetic media for plane-polarized light, and that maximum rotation is produced by use of a field parallel to the electromagnetic wave direction. Rotation produced in laser 10 responsive to the energizing of winding 13 by source 14 results in such rotation.

Where the device of FIG. 2 is operating as an amplifier, rotation within the medium may be detected, for example, by means of an analyzer, not shown. Since magnetic rotation of electromagnetic wave energy is non-reciprocal, use of the depicted arrangement operated in the amplifier mode may serve to prevent back passage of energy and so enable the laser 10 to operate as its own isolator.

Again, based on the fact that magnetic rotation is non-reciprocal, and operating the laser 10 of FIG. 2 as an oscillator, it is apparent that energizing winding 13 results in some cancellation due to subtraction of the forward and backward moving waves (in each successive region in which the electric vectors of these waves are out of phase by some value approaching 180°), and, in consequence, reduces the amplitude of the output from the device. It is most convenient to operate in a digital fashion using this arrangement. Source 14 may deliver D.C., A.C., or intermittent current.

Operation of the element of FIG. 2, either as a traveling wave or standing wave device, in the manner described implies plane polarization of the laser radiation. This plane polarization may naturally occur for any of the reasons for which it is observed in other solid-state lasers, as, for example, by reason of the non-equivalent sites occupied by the emitting ions or by virtue of any anisotropic property of the crystal itself. Where it occurs naturally, it may be pure, or it may arise merely as a component together with the circular polarization which results for many arangements. Such a component which results in an over-all elliptic polarization is sufficient for the operation described. In certain cases, such component is insufficient or even absent. In these instances, plane polarization may be introduced by either or both of the polarizing elements 16 and 17, indicated in broken lines.

Where the polarizer takes the form of element 16, it serves purely as a reflecting element and brings about the results noted, thereby cooperating to bring about some cancellation for the continuing non-reciprocal rotation produced by any component of magnetization in the direction of beam propagation. Where element 17 is present, it may serve the same purpose and may also serve the function of an analyzer preventing emission of laser radiation for any light rotated a total angle of ninety degrees. In the demagnetized state the magnetization in the rod breaks up into a complex domain structure and has little or no net rotation, so that the laser operates when the pump power level exceeds the appropriate threshold. Selection of the proper pump level may result in total quenching by either of the mechanisms described upon application of a magnetic field having a component in the direction of beam propagation.

Operation in the manner described in conjunction with FIG. 2 may be facilitated by orienting the crystal so that an easy axis of magnetization [111] is in the direction of beam propagation. Under these circumstances, application of a magnetic field in this direction results in little or no tuning of frequency (upon which phenomenon the device of FIG. 3 relies) and relatively small fields are sufficient to saturate the rod.

The device of FIG. 3 again includes a laser rod 20, which may be identical to rod 10 of FIG. 2 including all of the variations there described, being provided with polished ends 21 and 22, mirrored or not, as desired. For simplicity, neither an incoming beam for operation in the amplifier mode nor a pump source for operation as an oscillator is shown. A magnetic field in accordance with this arrangement is introduced in a direction normal to that of the laser beam 25 by means of pole pieces 26 and 27, the two being provided with a winding 28 receiving energy from source 29. Pole pieces 26 and 27 are provided with means for rotating their major axis within a plane normal to rod 20.

Figure 3:
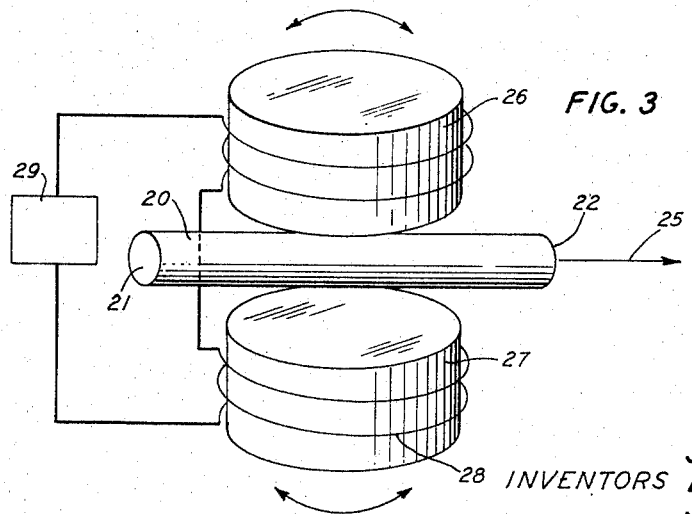
FIG. 3 is a perspective view of a laser also provided with means for introducing a magnetic field in accordance with an arrangement alternative to that of FIG. 2.

The effect of the normal magnetic field produced in the device of FIG. 3 is dependent upon the energy levels within the material of element 20 in accordance with the mechanism attributed to Zeeman. Different ends may, accordingly, be accomplished. Since the thresholds for the differing transitions (with and without application of field or, alternatively, for different crystallographic directions in the normal plane) may differ, the output may be treated as amplitude modulated, or the variation in threshold may be utilized merely to switch the laser on and off as for Q-spoiling. Since the splitting for many of the included systems is substantially anisotropic, the frequency of the predominant mode may be shifted. This may be accomplished to frequency modulate the output or merely to tune the radiation to some desired value. Depending upon which of these objectives is sought, the source 29 may be D.C., adjustable, or variable in accordance with some desired intelligence.

The depicted devices are, of caurce, merely illustrative of but a small number of the large group of objectives which may be served by this invention. Certain more sophisticated arrangements are described and claimed in copending application Ser. No. 536,803 filed March 23, 1966, and any of these may desirably utilize any of the teachings contained in this description. Additionally, alternate means of accomplishing the ends described in the accompanying figures may be suitable or preferred. For example, high frequency use may dictate placing the laser, with or without a pump, within a mirrowave cavity.

In summation, the invention derives from the discovery that YIG and related ferrimagnetic garnet hosts constitute suitable hosts for laser operation. Certain active ion systems have been shown to be operative. These may be simple systems including only a single rare-earth ion or may utilize two, three, four or more to more effectively utilize the energy introduced by the pump. This discovery gives rise to a new class of laser devices which may owe their significance simply to the change in emission frequency resulting from the effect of the host on the active ion or to any of the other attributes associated with a different host material.

It is contemplated that most of the laser devices herein in which a magnetic field is utilized to alter the character of the laser output operable continuously. It is certainly true that this kind of operation is to be preferred for most arrangements in which it is intended to modulate the beam either in amplitude or frequency in accordance with some intelligence. Certain other of the proposed devices, however, do not require and may not even suggest more than intermittent operation. While these magnetic hosts are suitable for either purpose, it is known that doping levels, both of emitting and absorbing ions, should often be determined with one or the other objective in mind. Accordingly, a preference exists for higher levels as, for example, from 0.003 atom up for CW operation, while intermittent operation, at least at high energy levels, may give rise to desired emitting ion concentrations of the order of 0.0003 atom and below.

The importance of this laser action in a saturable magnetic host should not, however, be overlooked. A class of devices, dependent at least in part for their operation upon the effect of a magnetic field on the character of the laser beam, is described. The specific devices depicted of course constitute but a limited number of this class. The exciting realization of laser action in such an environment gives rise to many more devices utilizing Zeeman splitting, deflection, Q-spoiling, amplitude and frequency modulation, etc., and all such arrangements in which the laser host is within that class of materials defined are considered to be within the scope of this invention.

What is claimed is:

1. Laser comprising a host consisting essentially of a ferrimagnetic composition of the garnet structure containing an emitting ion capable of lasing over the wavelength range of about one micron to about 4.5 microns in which the laser comprises a single crystal body of $$M_{3-2x-y}Ca_{2x}M'_yFe_{5-x-z}V_xM''_zO_{12}$$

wherein M is at least one of the ions yttrium, erbium, ytterbium, thulium, lutecium, or bismuth, $M_2$ is at least one of the ions holmium, erbium, and thulium and includes at least one ion not included with M, M'' is at least one of the ions gallium and aluminum, $x$ is from 0 to 1.5, $y$ is from .003 to .6, and $z$ is from 0 to 2.5.

2. Device of claim 1 in which the said body contains holmium and at least one ion selected from the group consisting of thulium, erbium, and ytterbium.

3. Device of claim 2 in which the said body contains holmium and at least one ion selected from the group consisting of erbium and thulium.

4. Device of claim 1 in which the said body contains thulium as an emitting ion.

5. Device of claim 1, together with means for producing a magnetic field in such manner that there is interaction between the laser beam and the said field.

6. Device of claim 5, in which the said field is substantially parallel with the laser beam.

7. Device of claim 5 in which the said field is substantially normal to the laser beam.

8. Device of claim 7, together with means for changing the direction of the said field.

References Cited

Soviet Physics—Solid State, Krinchik, pp. 273–277, vol. 5, No. 2, August 1963.

Applied Physics Letters, Geusic et al., pp. 182–184, vol. 4, No. 10, May 15, 1964.

Applied Physics Letters, Strauss et al., pp. 18–19, vol. 6, No. 1, Jan. 1, 1965.

Applied Physics Letters, Geusic et al., pp. 175–177, vol. 6, No. 9, May 1, 1965..

Applied Physics Letters, Damon et al., pp. 194–195, vol. 6, No. 10, May 15, 1965.

JOHN KOMINSKI, Primary Examiner

U.S. Cl. X.R.

252—301.4